US006365816B1

(12) United States Patent
Rossum

(10) Patent No.: US 6,365,816 B1
(45) **Date of Patent: *Apr. 2, 2002**

(54) DIGITAL SAMPLING INSTRUMENT EMPLOYING CACHE MEMORY

(75) Inventor: David P. Rossum, Aptos, CA (US)

(73) Assignee: Creative Technology Ltd., Singapore (*) Notice: Subject to any disclaimer, the term of this patent is extended or adjusted under 35 U.S.C. 154(b) by 0 days.

This patent is subject to a terminal disclaimer.

(21) Appl. No.: 09/618,963

(22) Filed: Jul. 19, 2000

Related U.S. Application Data

(63) Continuation of application No. 09/187,139, filed on Nov. 6, 1998, now Pat. No. 6,137,043, which is a continuation of application No. 08/903,329, filed on Jul. 29, 1997, now Pat. No. 5,925,841, which is a division of application No. 08/636,827, filed on Apr. 23, 1996, now Pat. No. 5,698,803, which is a continuation of application No. 08/202,922, filed on Feb. 28, 1994, now abandoned, which is a division of application No. 07/882,178, filed on May 11, 1992, now Pat. No. 5,342,990, which is a continuation-in-part of application No. 07/462,392, filed on Jan. 5, 1990, now Pat. No. 5,111, 727.

(51) Int. Cl.[7] .............................. G01H 7/10; G01H 7/12
(52) U.S. Cl. .............................. 84/603; 84/604; 84/607; 708/290
(58) Field of Search .............................. 84/601–608, 623, 84/659–661, 693, DIG. 9, DIG. 26, DIG. 30; 708/290, 313, 315, 420, 421

(56) References Cited

U.S. PATENT DOCUMENTS 4,377,960 A * 3/1983 Okumura ..................... 84/605

* cited by examiner

*Primary Examiner*—Stanley J. Witkowski
(74) *Attorney, Agent, or Firm*—Townsend and Townsend and Crew LLP

(57) ABSTRACT

A digital sampling instrument for multi-channel interpolative playback of digital audio data stored in a waveform memory provides improved interpolation of musical sounds by use of a cache memory.

8 Claims, 12 Drawing Sheets

| STATE COUNTER (8 PER CHANNEL) | 0 | 1 | 2 | 3 | 4 | 5 | 6 | 7 | 0(NEXT CHANNEL) |
|---|---|---|---|---|---|---|---|---|---|
| CBA ADDRESS | NEW VALID CACHE BASE ADDRESS ------------------------→ | | | | | | | DON'T CARE | NEW VALID CBA |
| CACHE RAW READ OPERATION | NOP | READ POINT 0 | READ POINT 1 | READ POINT 2 | READ POINT 3 | READ POINT 4 | READ POINT 5 | READ POINT 6 | NOP |
| CR READ OPERATION CBA EVEN | NOP | READ EVEN POINT | READ ODD POINT | READ EVEN POINT | READ ODD POINT | READ EVEN POINT | READ ODD POINT | READ EVEN POINT | NOP |
| CR READ OPERATION CBA ODD | NOP | READ ODD POINT | READ EVEN POINT | READ ODD POINT | READ EVEN POINT | READ ODD POINT | READ EVEN POINT | READ ODD POINT | NOP |
| EVEN CR OPERATION CBA EVEN | AVAIL FOR WR | READ POINT 0 | AVAIL FOR WR | READ POINT 2 | AVAIL FOR WR | READ POINT 4 | AVAIL FOR WR | READ POINT 6 | AVAIL FOR WR |
| ODD CR OPERATION CBA EVEN | AVAIL FOR WR | AVAIL FOR WR | READ POINT 1 | AVAIL FOR WR | READ POINT 3 | AVAIL FOR WR | READ POINT 5 | AVAIL FOR WR | AVAIL FOR WR |
| EVEN CR OPERATION CBA ODD | AVAIL FOR WR | AVAIL FOR WR | READ POINT 1 | AVAIL FOR WR | READ POINT 3 | AVAIL FOR WR | READ POINT 5 | AVAIL FOR WR | AVAIL FOR WR |
| ODD CR OPERATION CBA ODD | AVAIL FOR WR | READ POINT 0 | AVAIL FOR WR | READ POINT 2 | AVAIL FOR WR | READ POINT 4 | AVAIL FOR WR | READ POINT 6 | AVAIL FOR WR |
| MAU EVEN WRITE CBA EVEN | WRITE | WAIT | WRITE | WAIT | WRITE | WAIT | WRITE | WAIT | WRITE |
| MAU ODD WRITE CBA EVEN | WRITE | WRITE | WAIT | WRITE | WAIT | WRITE | WAIT | WRITE | WRITE |
| MAU EVEN WRITE CBA ODD | WRITE | WRITE | WAIT | WRITE | WAIT | WRITE | WAIT | WRITE | WRITE |
| MAU ODD WRITE CBA ODD | WRITE | WAIT | WRITE | WAIT | WRITE | WAIT | WRITE | WAIT | WRITE |

FIG. 12

DIGITAL SAMPLING INSTRUMENT EMPLOYING CACHE MEMORY

CROSS-REFERENCE TO RELATED APPLICATIONS

The present application is a continuation of application Ser. No. 09/187,139, filed Nov. 6, 1998, U.S. Pat. No. 6,137,043, which is a continuation of application Ser. No. 08/903,329, filed Jul. 29, 1997, U.S. Pat. No. 5,925,841, which is a division of application Ser. No. 08/636,827, filed Apr. 23, 1996, U.S. Pat. No. 5,698,803, which is a continuation of application Ser. No. 08/202,922, filed Feb. 28, 1994, abandoned, which is a division of application Ser. No. 07/882,178, filed May 11, 1992, U.S. Pat. No. 5,342,990, which is a continuation-in-part of application Ser. No. 07/462,392, filed Jan. 5, 1990, U.S. Pat. No. 5,111,727.

BACKGROUND OF THE INVENTION

The present invention may be efficiently implemented in a single VLSI integrated circuit of low cost. The present invention provides for a very high channel count, limited only be the speed and-cost of the circuit and the average degree of upward pitch shifting required. Also, the present invention allows for use of multiple interpolator circuits to be used with a single waveform memory.

The present invention relates to electronic musical instruments, and more particularly to digital sampling instruments which create musical notes by reproducing recorded waveforms of musical instruments or sound effects, or mathematically calculated waveforms from a waveform memory at a variable playback rate. As has been previously disclosed in the above-identified cross-referenced patent application Ser. No. 07/462,392 filed Jan. 5, 1990 one technique for improving the performance of such instruments is the use of a cache memory and waveform interpolation. Such a technique increases the available channel count of the instrument by eliminating the waveform memory access time bottleneck which limits performance. While the basic use of cache memory has been previously described, there are several improvements beyond the preferred embodiment described in patent application Ser. No. 07/462,392 which are described herein.

SUMMARY OF THE INVENTION

It is an object of the present invention to provide improved N point interpolation variable pitch playback of musical sounds. The techniques so described can be efficiently implemented in the preferred embodiment by a single VLSI circuit of low cost. The preferred embodiment allows a very high channel count which will support many simultaneous musical notes. It also allows memory systems having variable access times, as well as the use of more than one interpolator circuit or chip with a single sound waveform memory.

Further described are techniques to optimize the performance of the system by decreasing the complexity of the VLSI circuit required to implement cache memory. Another technique described improves the cache system by increasing the degree to which upward pitch shifting on a minority of the channels can occur.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification,illustrate embodiments of the invention and, together with the description, serve to explain the principles of the invention:

FIG. 12 depicts a reservation table for cache RAM.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
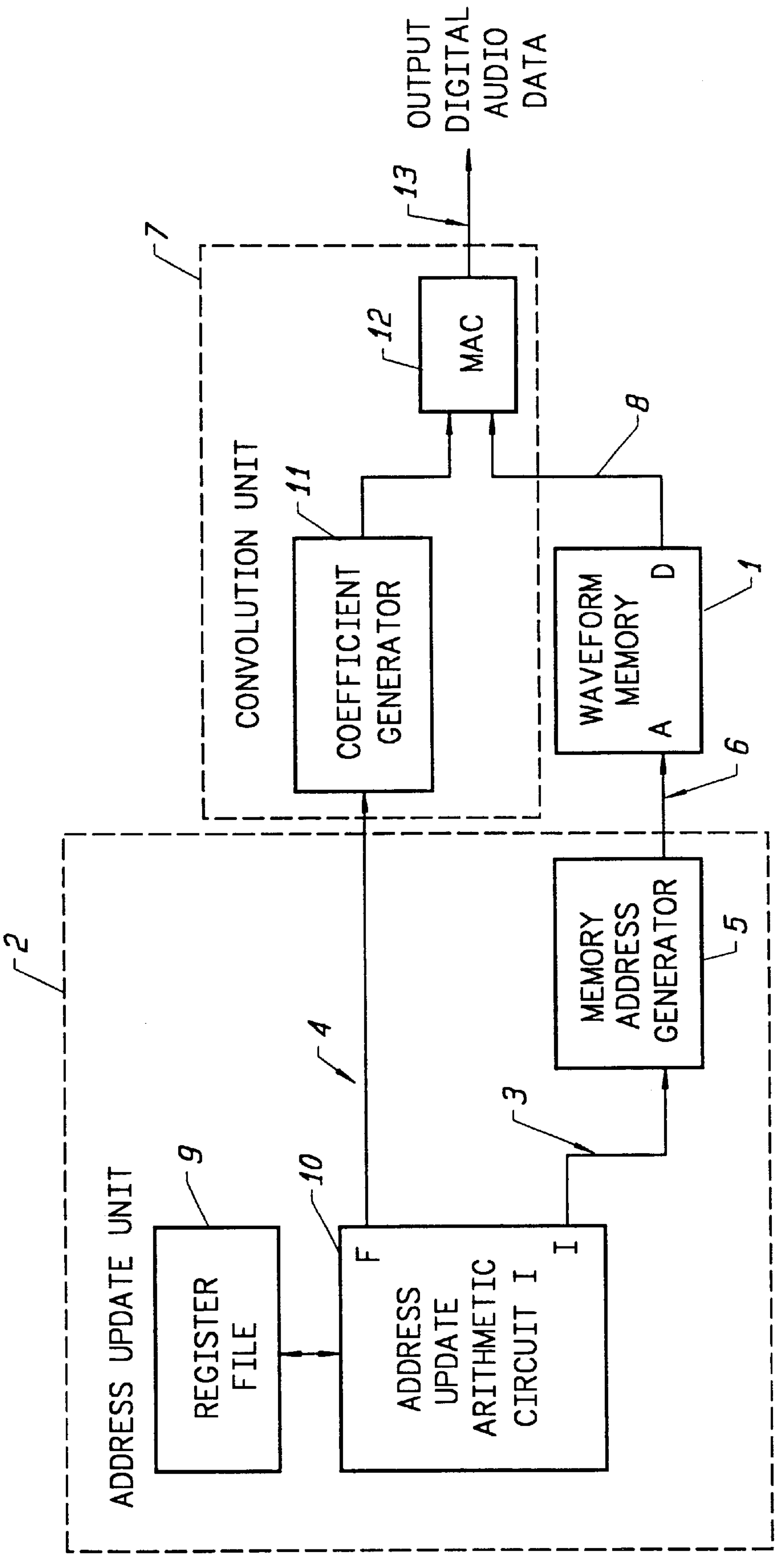
FIG. 1 depicts a block diagram of an interpolator.

The fundamental architecture of a sampling digital instrument which supports L channel pitch shifting by interpolation, as described in patent application Ser. No. 07/462,392 is shown in FIG. 1 and includes a waveform memory 1, an address update unit 2 supplying an integer part 3 and a fractional part 4 of a current address for each of L channels, a memory address generators producing waveform memory addresses 6 from the integer part 3 of the current address and a convolution unit 7 producing output samples depending on the fractional address 4 and the data 8 from waveform memory 1. For each output sample and each of the L channels, the address update arithmetic circuit 10 provides a new current memory address consisting of an integer 3 and fractional 4 part which is created from the previous current address stored in register file 9 by adding a phase increment which is also stored in register file 9, and the convolution unit's multiply-accumulator circuit 12 computes a sum of products of samples located in the waveform memory times coefficients (which depend on the fractional part of the memory address). This can be represented by the formulas:

$$A_n=A_{n-1}+P$$

$$Y_{i+f}=X_{i-\frac{n-1}{2}}C_0(f)+X_{i-\frac{n-3}{2}}C_1(f)+\ldots+X_iC_{\frac{n-1}{2}}(f)+\ldots+X_{i+\frac{n-1}{2}}C_n(f)$$

where An is the new current address, An−1 is the previous current address, P is the phase increment, Yi+f is the output signal representing the current address with integer part i and fractional part f, Xm represents the waveform memory sample at address m, and Cn(f) represents the nth coefficient which is a function of f.

The coefficients Cn(f) are computed in the coefficient generator 11 either algorithmically from the fractional address f, by a table lookup based on f, or by a combination of these two approaches, such as linear interpolation of a limited size table. The output signals Y are digital output data 13 ready to be further processed by additional circuitry or by time domain multiplexing of some of the existing blocks.

The current memory address A for any given channel is continually being increased by the phase increment P at each output sample period. The magnitude of the phase increment determines the pitch shift from the original pitch, with an increment of unity being no shift, and increments smaller than unity shifting the pitch downward. As described in patent application Ser. No. 07/462,392, the phase increment is most commonly less than one. Consequently, the number of accesses of waveform memory can be reduced by the use of a cache memory. This will in turn increase the number of channels which can be supported by a single waveform memory.

Figure 2:
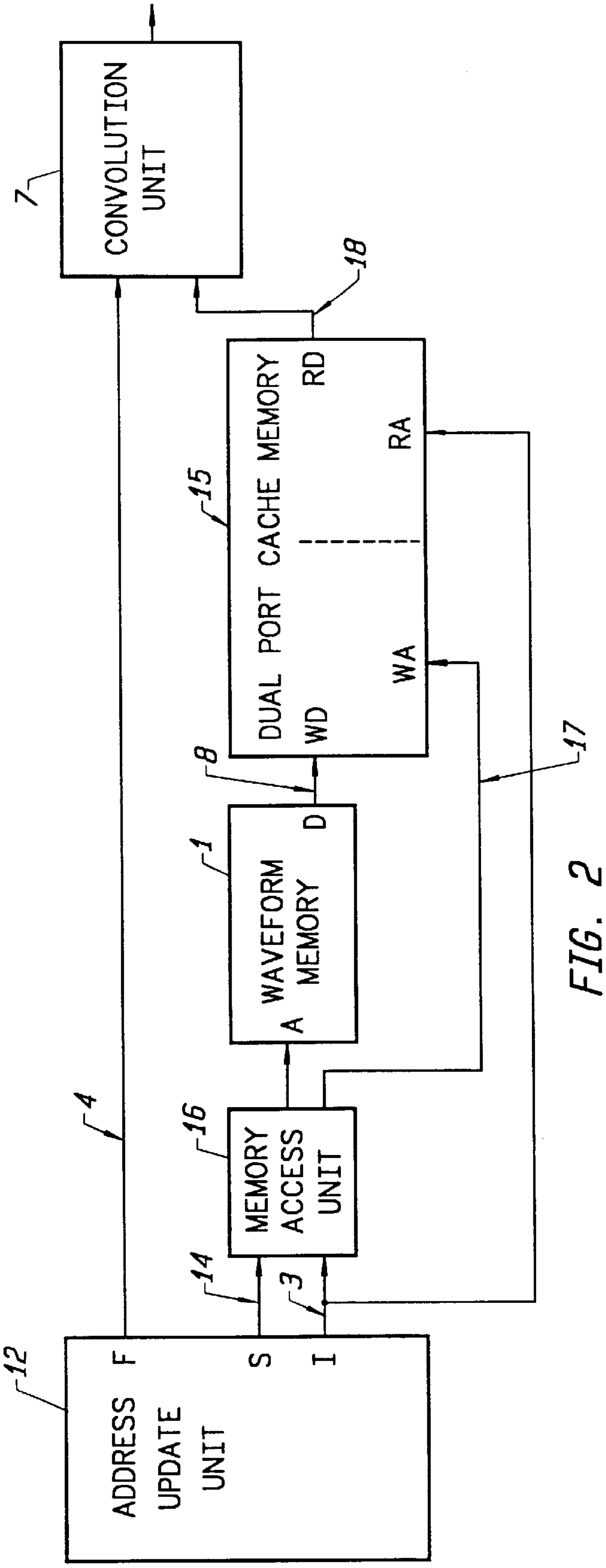
FIG. 2 depicts a block diagram of an interpolator with cache memory.

A cache memory system is shown in FIG. 2. In this system, not only does address update unit 2 produce an integer 3 and fractional 4 part of a new current address, it also produces a cache data required size (S) 14, defined as:

$$S=\mathrm{Int}(A_n)-\mathrm{Int}(A_{n-1})$$

where Int(x) is the integer part of x.

The cache memory 15 contains M entries for each channel, and M must be an even power of two. A minimum of N entries is required for N point interpolation, that is $M \geqq N$. Thus, for example, linear interpolation (N=2) requires 2 or more entries per channel, and eight point interpolation M is greater than or equal to 8.

Cache memory 15 is written with S samples from waveform memory 1, the last of which is located at the integer part 3 of the current memory address. The waveform memory addresses to accomplish this are generated by memory access unit 16, which can operate independently and asynchronously from the address update and convolution units. Memory access unit 16 also generates the cache write address 17 at which the samples are stored.

Ultimately, the required samples 18 are read from the cache memory at sequential addresses, the last of which is located at the truncated least significant portion of the integer part 3 of the current memory address, and supplied to the convolution unit for multiplication and accumulator with coefficients derived from the fractional part 4 of the current address. This system operates according to the algorithm previously described in patent application Ser. No. 07/462,392.

The method described in patent application Ser. No. 07/462,392 has some limitations. Specifically, a dual port cache memory with separate write and read addresses,is required, and the time required to complete all waveform memory accesses in the worst case is limited, thus placing an unnecessary limit on the upward pitch shifting capability of the circuit. The present invention eliminates both these limitations, and is shown in block diagram form in FIG. 3.

As in all interpolation systems, an address update unit 2 produces a new current address for each output sample for each channel. However, in the present invention, the current address for each channel is stored in an external address register file 21, along with the cache size and cache base address for each channel. Address register file 21 is only used by address update unit 2 for two cycles (one to fetch the old current address and another to store the new current address) for each channel, so it is available for other accesses which are controlled by memory access unit 23 on the remaining cycles. In the preferred embodiment, alternate cycles are available to the memory access unit, as determined by system state counter 26.

Address update unit 2 produces a cache request signal 29 for a given channel if the integer part of the new current address differs from the integer part of the old current address. This request indicates that a waveform memory access is required. It also produces a cache size (S) and cache base address (CBA). The cache size is defined as above; the cache base address is a cumulating sum of the cache size, or:

$$CBA_n=(\mathrm{Int}(A_n)-\mathrm{Int}(A_{n-1})+CBA_{n-1}) \bmod M$$

where M is the cache memory size in entries per channel.

The need for a cache base address is twofold. First, the size of the cache is not an even power of two, the mechanism described previously in patent application Ser. No. 07/462, 392 will not function because the mod operation in the equation above defining the CBA cannot be implicitly performed by truncation leaving only the least significant bits of the integer part of the current address. Thus a separate cache base address, which can be modulo M must be maintained. However, even when M is an even power of two, there is reason to maintain a separate cache base address. A typical feature of digital sampling musical instruments is the ability to loop a sound in waveform memory. This is typically accomplished by an algorithm implemented in the address update unit in which the new current address is compared against a loop end address. If the end address has been exceeded, the size of the loop is subtracted to begin the loop of sound again near the start. This technique is well known to those skilled in the art. Because the size of the loop is not necessarily an integer multiple of the cache size, the cache address cannot be identical with the least significant bits of the current address if a loop is implemented. Instead, a separate cache base address must be maintained. When a loop occurs, the current address is updated according to a conventional looping algorithm, but the cache base address is simply increased modulo M by the phase increment as with an unlooped address update.

Figure 3:
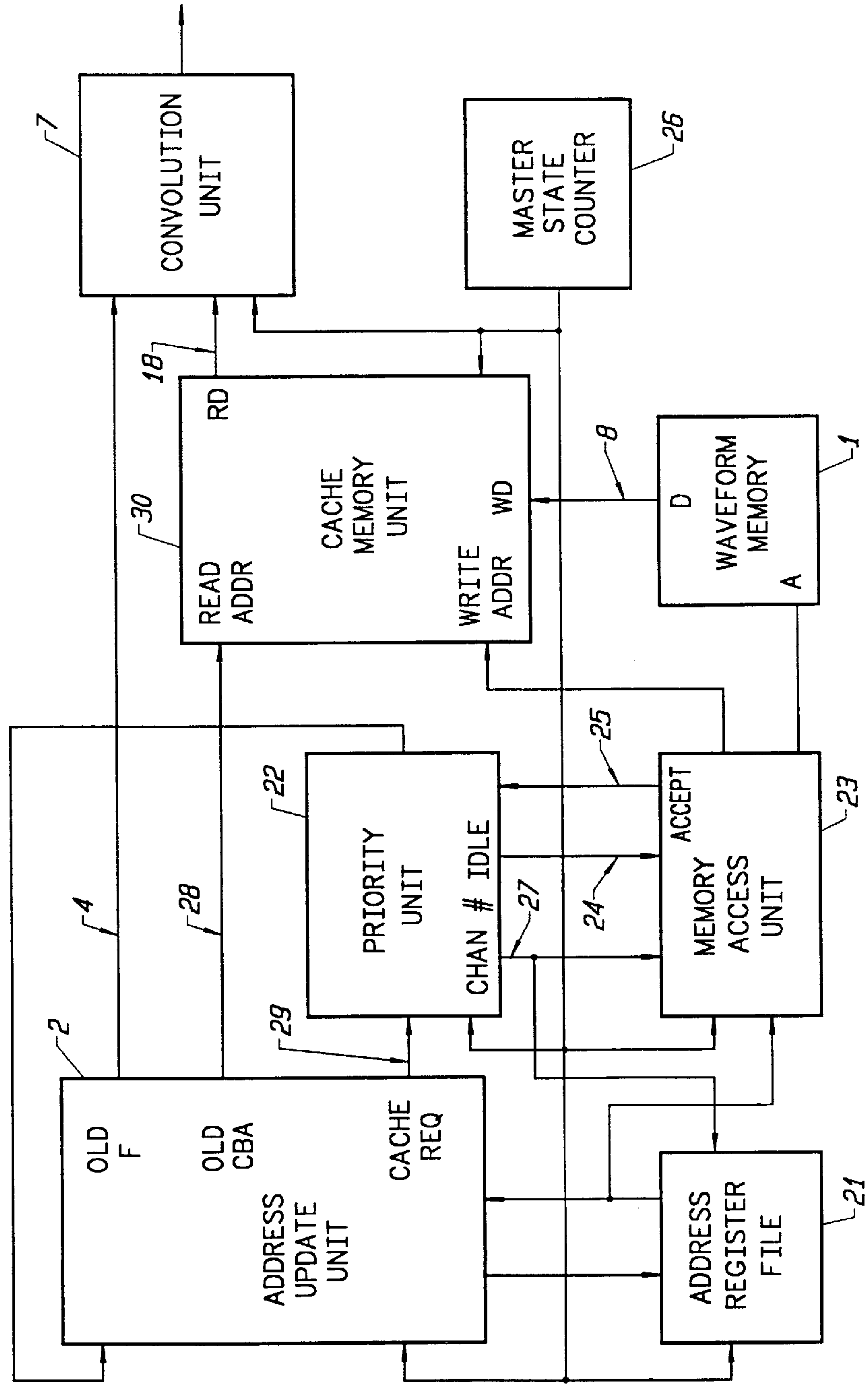
FIG. 3 depicts a block diagram of the present invention.

In FIG. 3, priority unit 22 determines from the cache requests of all channels which channel's request should be honored first. It then supplies that priority channel's number 27 to memory access unit 23 and to address register file 21. An idle signal 24 is also supplied to indicate that no requests are pending, and an accept signal 25 causes the priority unit to reset a channel's cache request as having been accepted for service.

Memory Access Unit 23 responds to a request for a given channel's service by asserting accept signal 25 after acquiring the channel number from priority unit 22, and the current address, cache size, and cache base address for that channel from the address register file 21. For each waveform memory location, beginning at the current address and decrementing until S locations have been accessed, waveform memory 1 is accessed and the sample located at the indicated address is placed into cache memory 30. The first fetched sample is placed at the cache base address for the channel, and subsequent samples, if any, are placed at successively decreasing locations module M.

The Convolution unit 7 behaves similarly to typical interpolation systems, responding to the fractional part 4 of the old current address to determine a set of N coefficients for N point interpolation. The old cache base address 28 is used to generate the starting location of the sample points in the cache memory, from which the sum of products of samples and coefficients is generated.

Master state counter 26 provides information used by all units as to the channel number under service and the processing state for that channel.

Now that the overall structure of the present invention has been explained, the details of each of the elements will be explained in detail.

Figure 4:
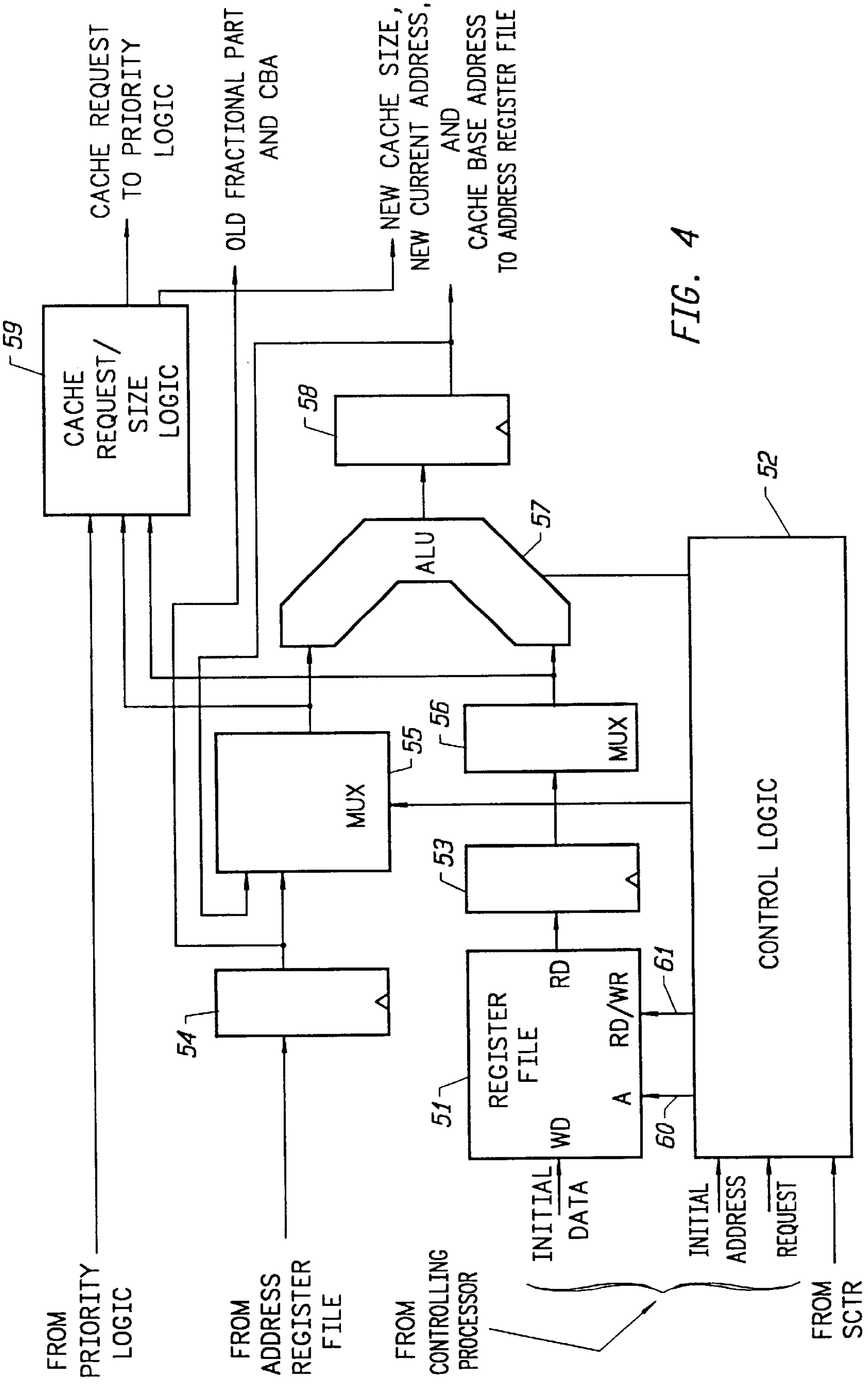
FIG. 4 depicts details of the address update unit of FIG. 3.

The address update unit for the preferred embodiment shown in FIG. 4 is similar to that required for most interpolators, and should be familiar to those skilled in the art. Constants for control of the current address are stored in register file memory 51, which is accessed according to address and read/write signals 60 and 61 supplied by control logic block 52, which derives the register file access pattern from the master state counter. For cycles in which a register file access is not required, initial data can be written into the register file as requested by a controlling microprocessor. Constants accessed from register file 51 are loaded into register 53 for manipulation by the address update ALU 57.

For example, the phase increment P is loaded into register 53 during a particular cycle. Simultaneously, data from the address register file is loaded into register 54. multiplexers 55 and 56 select appropriate fields of the data thus present in the registers to be manipulated by ALU 57 to produce the new current address and cache base address which are clocked into register 58. Multiple cycles are typically required in order to provide for sound looping by comparison of the results of the incremented current address to a loop end address and conditional subtraction of a loop size. At some value of the state counter, the completely valid new current address and cache base address are available in register 58 and can be re-written into the address register file along with the cache size produced by cache request/size logic block 59. This is repeated for each of the L channels to be processed according to the most significant portion of the state counter.

Other outputs from the address update unit are fractional part of the old current address and the old CBA. These are available from register 54 which has latched this data when accessed from the address register file prior to update. Another output is the cache request signal, which is derived from phase increment, old current address, old cache size, and any previously unhonored request from this channel, by cache request/size logic block 59.

The cache size for the preferred embodiment is slightly more complex than the equation for S above due to two complicating factors. First, in the preferred embodiment, there are two levels of priority for cache requests, low and high, as explained below. It is possible for a low priority request to remain unhonored for an entire sample period. In this case, the unhonored request must continue to persist, and be added to the cache size as an additional cache entry to be fetched.

Furthermore, for reasons of channel startup, it is necessary that if the previous cache size was set to zero by the processor, that any pending low priority request be ignored. Thus the logic for cache size follows the equation:

$$S=\mathrm{Int}(A_n)-\mathrm{Int}(A_{n-})+(\mathrm{OldS}!=0)*\mathrm{OldP}$$

where OldS is the old cache size, and OldP is the state of the low priority bit for this channel from the previous sample period. Note that S must be saturated to never exceed M, the number of cache entries per channel.

A low priority cache request is generated if S is equal to one. A high priority cache request is generated if S is greater than one.

One skilled in the art will note that there is redundancy in the definitions of S and the low priority and high priority signals. In the particular case of M (the number of cache entries per channel) being an even power of two, and N (the number of interpolation points) being M−1, the required values of S are zero to an even power of two, which must be very inefficiently encoded in log2M+1 bits. Encoding S=0 indicating zero cache entries required, S=1 to indicate either 1 or 2 cache entries required depending on the priority (low=1, high=2) and S>1 indicates S+1 entries required reduces the bit requirement to an efficient log2M bits.

Figure 5:
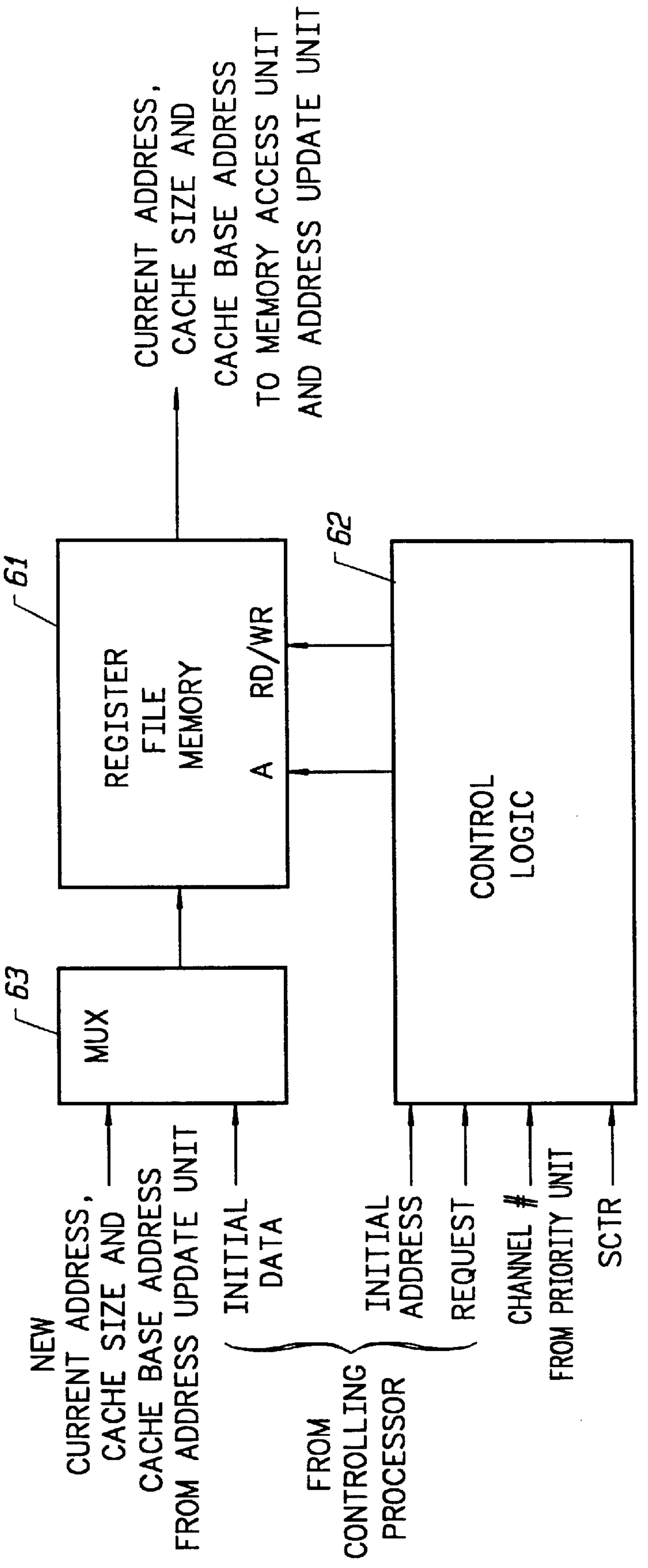
FIG. 5 depicts details of the address register file of FIG. 3.

The address register file shown in FIG. 5 is once again a block that should be understood by those skilled in the art. Register file memory 61 contains a location for each channel, in which is stored the current address, cache size, and cache base address. On alternate cycles as based on the master state counter, access to the memory is given to the memory access unit by reading the address indicated by the channel number provided by the priority logic. The remaining cycles can be allocated to reading and subsequently writing the data for the channel under service by the address update unit, whose channel number is determined from the most significant part of the state counter, or to writing initialization data into the register file memory from a controlling processor. The selection of the write data from controlling processor or address update unit is performed by multiplexer 63, which along with register file address and read/write is controlled by control logic block 62 which derives its sequence from the master state counter.

Figure 6:
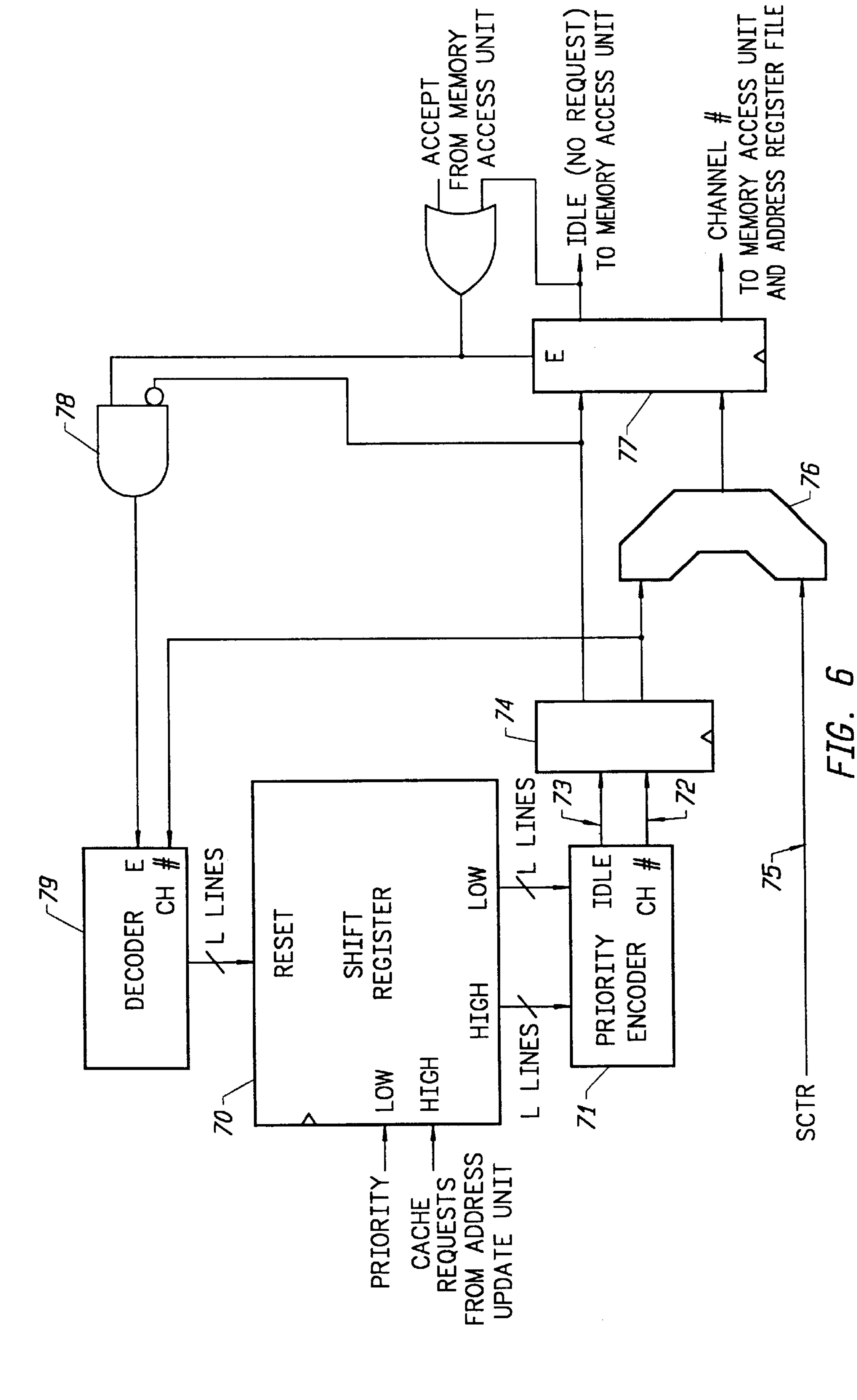
FIG. 6 depicts details of the priority unit of FIG. 3.

The priority unit is shown in detail in FIG. 6. Before the function of the priority unit can be explained, some further clarification of the function of this circuit is necessary.

While the minimum size for a cache memory is M=N entries per channel for an N point interpolator, if the cache memory is made larger, for example N+1 locations per channel, a significant benefit can be achieved.

Consider the typical operation of the cache memory and address update unit. The address update unit will determine the current address (both integer and fractional part) and initiate the convolution cycle for the corresponding output point. Note that this is why the old fractional part and CBA are used by the convolution unit and cache memory control circuit. The address update unit will then add the phase increment to the current address to produce a new address. If the new address has changed in integer part from the old address (S !=0), the memory access unit is requested to fetch the data from the new address and any intervening addresses into the cache. This must be done before the convolution cycle for the next output point, if only N locations are present in the cache, because all N must be valid for an N point interpolator.

Since each channel is operating with a phase increment of arbitrary fractional part, the number of waveform memory cycles will jitter between two values for each channel. For example, if the phase increment were exactly 0.5, alternate cycles would require zero or one waveform memory access. The typical case would involve a much more complex pattern of accesses. However, it is clear that there is a "worst case" instance in which every channel would have its larger number of waveform memory accesses required.

If the memory access unit were not capable of servicing all of these accesses, the cache would not be properly filled for some channel and an incorrect convolution would result. Thus the maximum upward pitch shift capability for such a unit with N locations per channel for an N point interpolator, L channels, and M waveform memory accesses per sample period, will be such that the sum of the integer parts of the phase increments for all the channels is less than M−L. Thus, for example, if M equals 64 and L equals 64, then no pitch shift can exceed unity.

The above situation can be alleviated by the use of an oversized cache memory and a priority circuit. If the cache memory has one more location than the number of points of interpolation, then one cache memory location can remain invalid for more than one cycle. Depending on the phase increment for that particular channel, the waveform memory access for that channel can be postponed for one or more cycles while accesses which are required more quickly are performed. It can be shown that in this case, the sum of the phase increments themselves cannot exceed M. This is a considerably better situation than that above.

The priority circuit must thus distinguish between two types of memory access unit requests, those which can be serviced later, and those which must be serviced before the next cycle. Within each category, a priority is established in which as a channel gets closer to its next service by the address update unit, it gets higher priority. Such a circuit is shown in FIG. 6.

There are two cache service request lines, one of low and one of high priority. The generation of these by the address logic has been explained above. A shift register 70 is enabled once for each channel, and thus maintains a bit for each channel for each of these two priority levels. The 2N outputs of the shift registers are routed into a standard priority encoder 71, whose output 72 is the number of the highest active input of high priority, if any, or if none, then the number of the highest active input of low priority. If no inputs are active, an idle flag 73 is asserted. The priority channel and idle flag are latched in register 74. Because the requests are being shifted within the shift register for each new channel processed, the number in register 74 must be added to the current active channel number 75 as provided by the master state counter to give the current priority channel. This sum at the output of adder 76 is stored in enabled register 77, and supplied to the address file as the memory access unit channel.

When enabled register 77 becomes enabled with non-idle data, a new priority channel has been accepted for service, and that channel's priority can thus be reset. This is determined by gate 78 whose output becomes active only if the output of register 74 does not correspond to an idle priority, and either the output of enable register 77 is idle, or the memory access unit is acknowledging acceptance of the channel indicated by enabled register 77. In this case, decoder 79 is enabled and resets both shift register bits corresponding to the channel which is indicated by register 74. Enabled register 77 is disabled after it has accepted the new channel because the memory access unit will negate its accept line and is re-enabled when the memory access unit has completed its processing of the previous channel and hence asserts the accept signal again.

Figure 7:
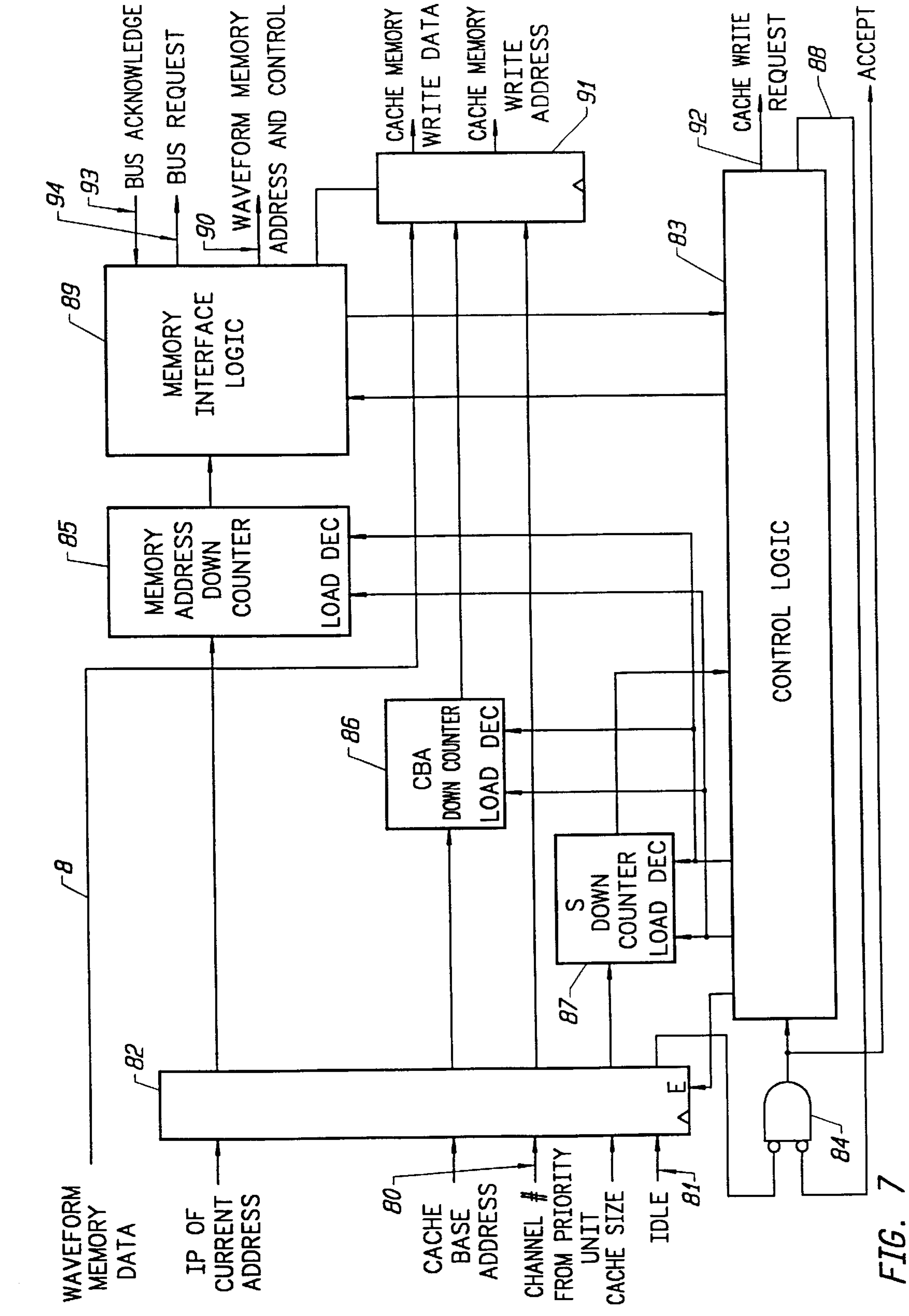
FIG. 7 depicts details of the memory access unit of FIG. 3.

FIG. 7 shows the details of the memory access unit. When a new priority channel 80 becomes valid from the priority unit as indicated by idle signal 81 becoming low, these signals along with the current address integer part, cache size, and cache base address for the channel as supplied by the address register file are each latched into enabled register 82 which is enable during cycles when the memory access unit has had an access to the address register file as determined by control logic 83 from the master state counter. AND gate 84 then accepts the data from enabled register 82, and initiates a set of memory access cycles if the data in register 82 is valid (not idle) and the memory access unit is not already busy. Control logic 83 begins a cycle by presetting down counters 85, 86, and 87 with the current address integer part, cache base address, and cache size respectively, and indicates the memory access unit is busy by asserting line 88. If the cache size is zero, the cycle is aborted. This is necessary for the startup condition on a channel so that the controlling processor, by setting cache size to zero, can halt any activity which will fill the cache.

If the cycle is not aborted, the memory interface logic 89 determines from the current address what type of memory is being used in this portion of the address space, and initiates an appropriate memory cycle by providing properly formatted address and control signals on waveform memory address and control lines 90.

Figure 11:
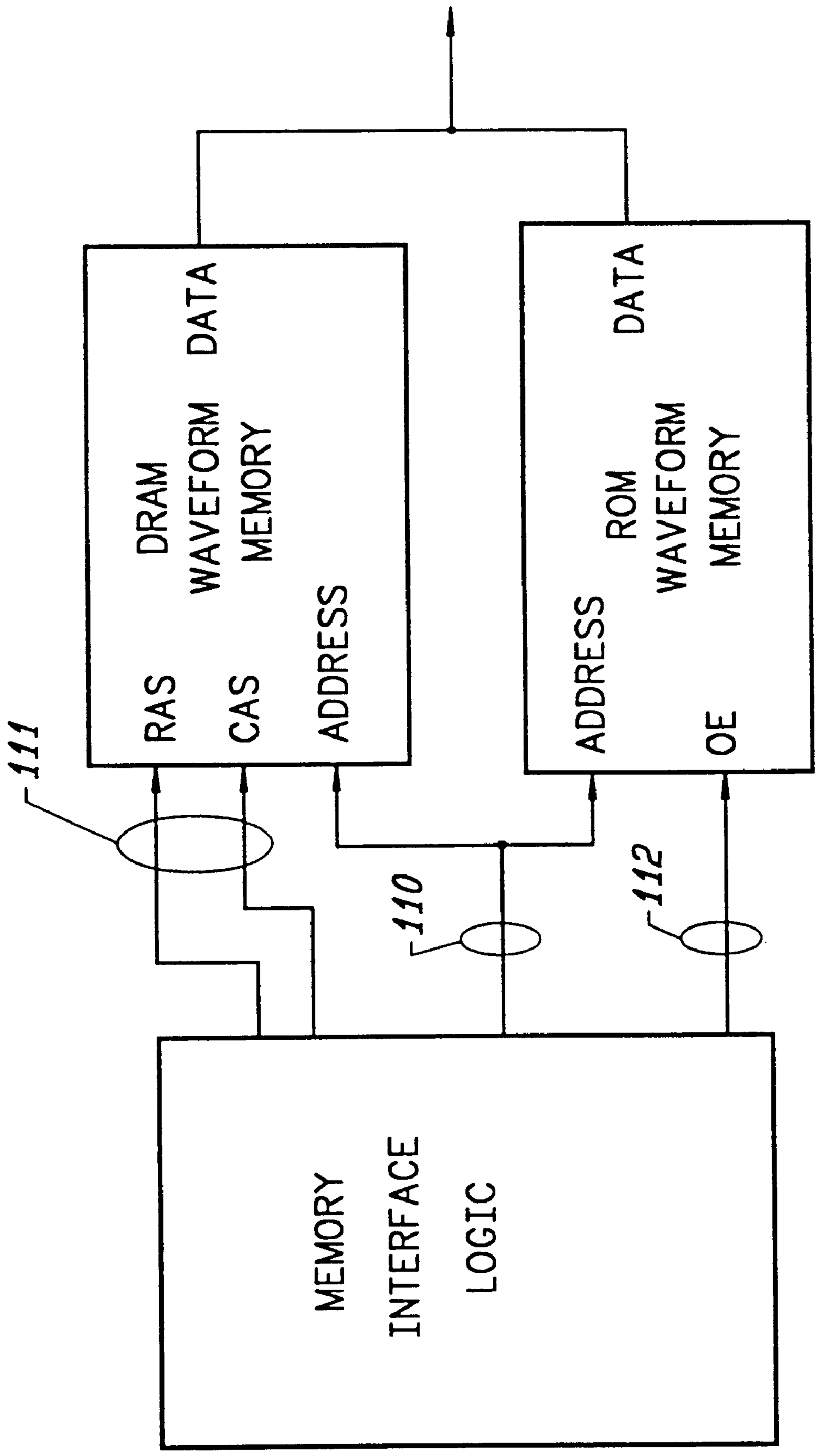
FIG. 11 depicts a block diagram of the use of multiple waveform memory types.

FIG. 11 shows a typical connection for multiple memory types. Note that some address and control lines can be shared by both types of memory (in this case, DRAM and ROM memory have been chosen) as illustrated by signals of group 110, while others are dedicated to either one or the other memory, such as group 111 for the DRAM, and 112 for the ROM. When the waveform memory data is present on the memory data bus 8 of FIG. 7, it is latched along with the channel number and the CBA counter value in enabled register 91, and memory interface logic 89 indicates to control logic 83 that the current memory cycle is complete. Control logic 83 then asserts cache write request line 92, indicating that the cache write data and cache address present in enabled register 91 have become valid, and also causes all three counters 85, 86, and 87 to be decremented. If the cache size in counter 87 has become zero, the request is complete and the busy line is brought inactive, enabling another request. If the cache size is non-zero, another memory cycle is initiated with the decremented current address and CBA.

Figure 10:
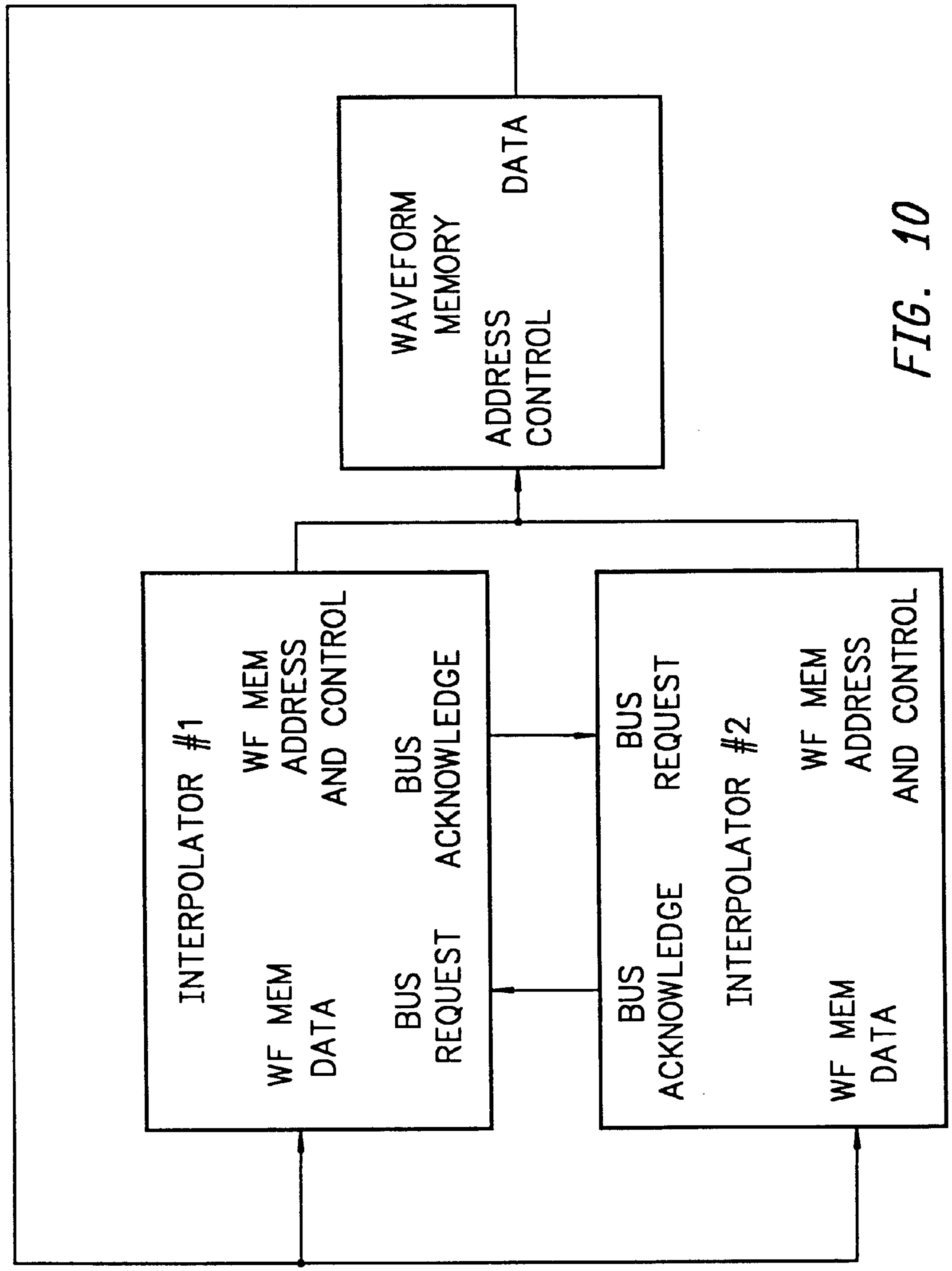
FIG. 10 depicts a block diagram of a shared memory system.

Note that dynamic memory can use page mode accesses for multiple memory cycles to adjacent memory locations, and that the logic to accomplish this is straightforwardly included into the memory interface logic. Also note that the asynchronous nature of the memory interface logic allows for optionally including logic for bus arbitration signals 93 and 94 (which would typically be a bus acknowledge and bus request respectively) which would allow sharing of a single waveform memory among multiple interpolator systems or chips. Naturally in such a case, the waveform memory address and control signals 90 would have to be capable of being output disabled by memory interface logic 89 when it was not the bus master. Such a multiple interpolator system is shown in FIG. 10.

Figure 8:
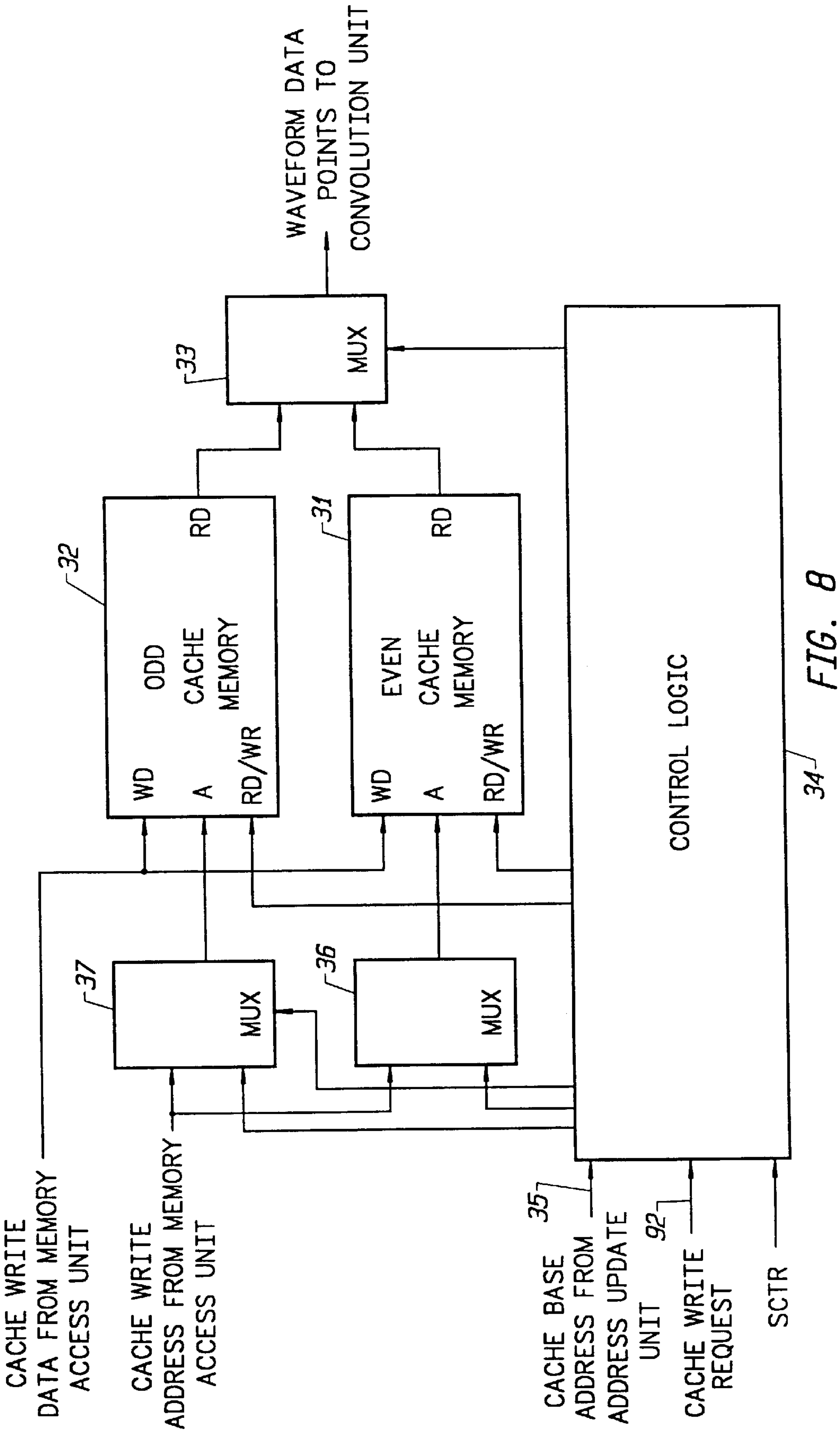
FIG. 8 depicts details of the cache memory unit of FIG. 3.

Details of the cache memory unit are shown in FIG. 8. Note that the silicon area required to implement dual port memory is nearly twice that require for single port memory. Hence it is cost effective to utilize single port memory whenever possible. Avoiding a dual port cache memory is accomplished by noting that the convolution algorithm requires the sum of products, each of which comes from successive locations in the cache memory. In other words, for an N point interpolator, the output will be the sum of a first coefficient times a first point in the cache memory, plus a second coefficient times the next point in the cache memory, et cetera, up to the Nth coefficient times the final sequential cache memory datum. Consequently, the cache memory can be divided into two separate single port memories as shown in FIG. 8. Even cache memory 31 contains the even locations and odd cache memory 32 contains the odd locations. Multiplexer 33 routes the output data from the cache memory active for reading data to the convolution unit. The convolution unit will thus access alternate memories, leaving the unaccessed memory free for accepting data from the waveform memory as directed by the memory access unit.

Control logic 34 determines from the read cache base address 35 supplied by the address update unit and the master state counter which memory will be active for reading during a given cycle.

This determines the state of multiplexer 33 as well as that of address multiplexers 36 and 37, which determine if memory 31 or 32 respectively is getting its address from the memory access unit or from the cache base address and channel number under service by the convolution unit.

By allocating at least one cycle of the convolution circuit to a function other than the convolution itself, either an idle cycle or one for scaling the volume of the resulting sum of products, one cache memory cycle per output point can require no read cycle and thus have both cache memories available for writing memory access unit data. As shown in the reservation table in table 1 (see FIG. 12) this then guarantees that the proper cache memory is available for a write access from the memory access unit within no more than two cycles. At typical clock rates, this occurs faster than the access times of memories suitable for waveform storage. Control logic 34 thus responds to a cache write request on line 92 by writing the waveform memory data at the required cache memory address within two cycles.

Figure 9:
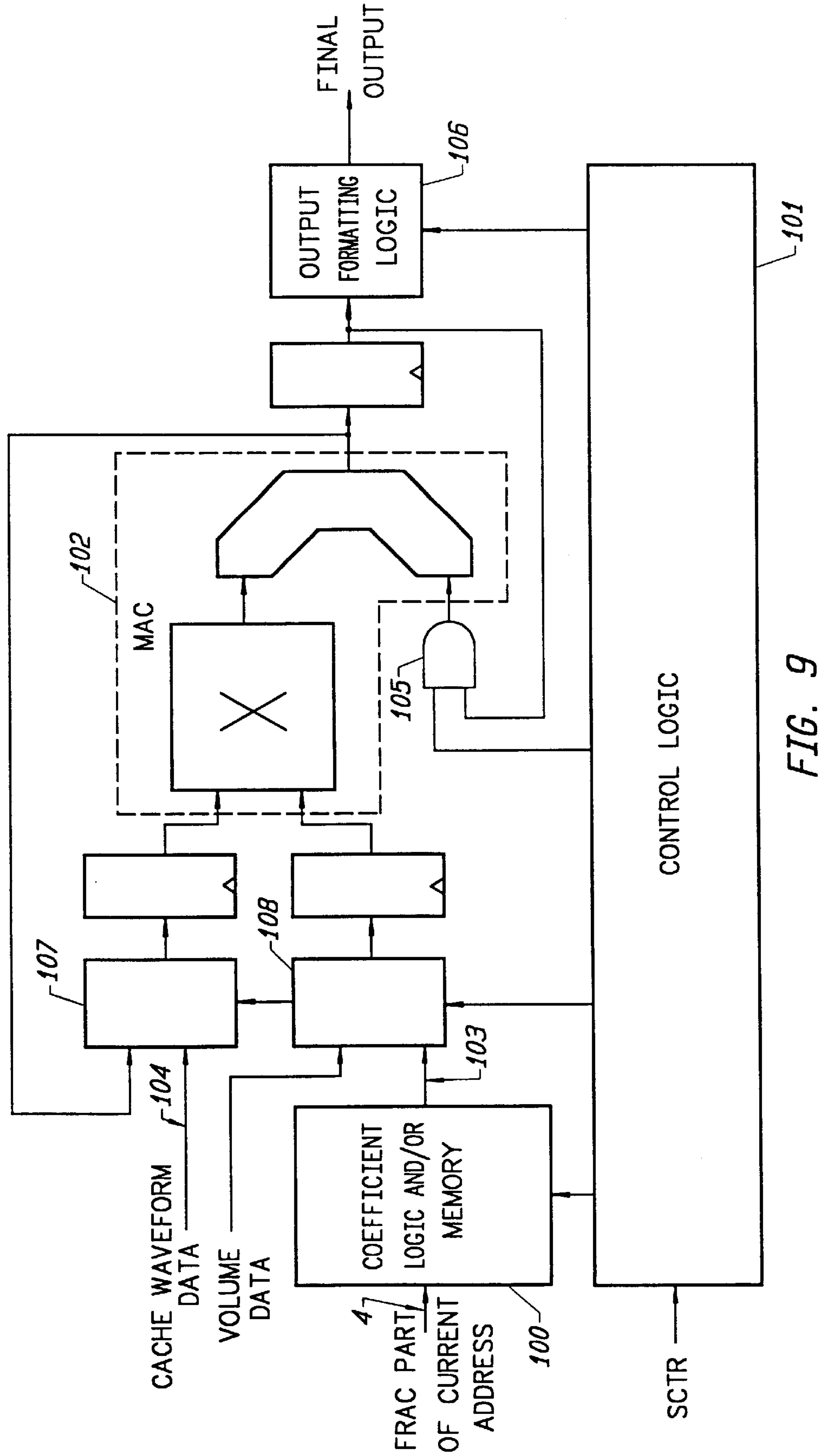
FIG. 9 depicts details of the convolution unit of FIG. 3.

The details of the convolution unit are shown in FIG. 9. Coefficient logic 100 derives the N coefficients as a function of current address fractional part 4 according to the master state counter as interpreted by control logic 101. This can be accomplished according to various algorithms, some of which are described in patent application Ser. No. 07/462,392. Multiply/accumulator 102 forms the sum of products required by the interpolation algorithm from the coefficients 103 times the cache memory data 104. Control logic 101 can reset the cumulating sum in the accumulator using AND gates 105 at the beginning of each new channel. The ultimate sum of products is then formatted, for example, into a serial data stream for further processing, by output formatting logic 106.

Provision is also made, by use of multiplexers 107 and 108, to use any idle cycles of the multiply/accumulator (one of which is necessary if single port cache memory has been used as described above) for alternate functions. For example, the output of the multiply/accumulator's final sum can be routed into one input of the multiplier by multiplexer 107, while a volume scaling number is routed into the other input by multiplexer 108, allowing the idle cycle to provide an individual volume control for each channel before the final sum of products is routed to output formatting logic 106.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for the multichannel interpolative access of digital audio data samples stored in a waveform memory, comprising:

a cache memory having a size sufficient to store two or more waveform samples for a plurality of said channels;

a cache controller configured to write said waveform samples into said cache memory so that same samples are available for real time audio interpolative playback, said cache controller including an address update unit, coupled to said cache memory, and a memory access unit coupled to said cache memory; and an interpolator configured to interpolate, responsive to a variable input, between two adjacent ones of said waveform memory samples to form an interpolation result;

wherein said memory access unit operates asynchronously from said address update unit and said interpolator.

2. The apparatus of claim 1 wherein said address update unit increments a current address for each channel and said memory access unit addresses the waveform memory using at least a portion of said current address.

3. The apparatus of claim 1 further comprising:

an address register file containing the integer part of a current address for each channel, and the required cache update size for each channel.

4. The apparatus of claim 1 wherein said cache controller addresses said cache memory for read and write operations such that a write operation overwrites data for a channel that is no longer required by said interpolator for a given sample point.

5. The apparatus of claim 1 wherein said memory access unit can operate in a burst mode.

6. A digital sampling instrument for the multichannel Nth order interpolative playback as output samples of digital audio data samples stored in a waveform memory comprising:

coefficient logic for generating N coefficients for each channel for each of said output samples;

a cache memory for storing at least N waveform memory data samples for each channel;

an address update unit, coupled to said cache memory;

a memory access unit coupled to said cache memory;

an interpolator for computing a sum of N products of the contents of said cache memory times said coefficients for each of several ones of said channels; and an output for providing said sum of products for each of said channels;

wherein said memory access unit operates asynchronously from said address update unit and said interpolator.

7. The digital sampling instrument of claim 6 wherein said address update unit increments a current address for each channel and said memory access unit addresses the waveform memory using at least a portion of said current address.

8. The digital sampling instrument of claim 6 wherein said memory access unit can operate in a burst mode.

* * * * *